(12) United States Patent
Lopez et al.

(10) Patent No.: US 7,247,684 B2
(45) Date of Patent: Jul. 24, 2007

(54) NETWORK POLYMERS COMPRISING EPOXY-TERMINATED ESTERS

(75) Inventors: Leonardo C. Lopez, Midland, MI (US); Jimmy D. Earls, Lake Jackson, TX (US); Jerry E. White, Lake Jackson, TX (US); Zenon Lysenko, Midland, MI (US); Marvin L. Dettloff, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 315 days.

(21) Appl. No.: 10/489,465

(22) PCT Filed: Apr. 11, 2002

(86) PCT No.: PCT/US02/11777

§ 371 (c)(1),
(2), (4) Date: Mar. 11, 2004

(87) PCT Pub. No.: WO03/022904

PCT Pub. Date: Mar. 20, 2003

(65) Prior Publication Data

US 2004/0180981 A1 Sep. 16, 2004

(51) Int. Cl.
*B32B 27/38* (2006.01)
*C08L 63/02* (2006.01)
*C08L 63/08* (2006.01)

(52) U.S. Cl. .................. 525/533; 428/457; 428/458; 525/423; 525/523; 525/524; 525/528; 525/532

(58) Field of Classification Search .............. None
See application file for complete search history.

(56) References Cited

U.S. PATENT DOCUMENTS 2,964,454 A * 12/1960 Findley .................. 522/88
2,964,484 A * 12/1960 Findley et al. ............ 525/121
3,006,936 A * 10/1961 Findley et al. ............ 528/366
3,035,069 A * 5/1962 Findley et al. ............ 554/149
3,042,692 A * 7/1962 Findley .................. 554/56
3,404,102 A * 10/1968 Starcher et al. ............ 528/361
3,823,107 A * 7/1974 Cotton .................. 524/384
4,193,905 A * 3/1980 Audykowski et al. ...... 523/400
4,540,657 A * 9/1985 Krishnamurthy ........... 430/546
5,973,082 A   10/1999 Elmore .................. 525/530

FOREIGN PATENT DOCUMENTS

GB       861971      3/1961
JP    62-75450 A  *  4/1987
JP    05295083 A  * 11/1993
WO    00/18751       4/2000

OTHER PUBLICATIONS

CAPLUS accession No. 1969:4955 for U.S. Patent No. 3,404,102 to Starcher et al., Oct. 1, 1968, four pages.*
CAPLUS accession No. 2000:227645 for PCT Publication No. WO 00/18751 A1, Bjornberg et al., Apr. 6, 2000, four pages.*

* cited by examiner

*Primary Examiner*—Robert Sellers

(57) ABSTRACT

The present invention provides network polymers obtained by curing compositions that comprise an ester with at least two terminal epoxy groups. Preferred esters include those represented by the formula (1), wherein each $R^1$ independently represents a substituted or unsubstituted homoaliphatic or heteroaliphatic group; A represents a substituted or unsubstituted homoalkylene, hetemalkylene, arylene, or heteroarylene segment; and n represents an integer equal to or greater than 2.

18 Claims, No Drawings

NETWORK POLYMERS COMPRISING EPOXY-TERMINATED ESTERS

FIELD OF INVENTION

The present invention relates to curable compositions and network polymers comprising esters that contain terminal epoxide groups. A further aspect of the invention relates to the use of these polymers in thermoset resin applications such as coatings, adhesives and composites.

BACKGROUND OF THE INVENTION

Esters having epoxy groups along their side chains, such as certain epoxidized vegetable oils, are known. See, for instance, U.S. Pat. No. 5,973,082. However, these conventional epoxidized esters have a relatively low reactivity due to the fact that the epoxy groups are internal, i.e. they are present along the side chains of the triacylglceride and not at the ends of the chain. This low reactivity makes these esters unpreferred or even unsuitable for a wide variety of applications.

Accordingly, the art has seen efforts to prepare esters having terminal epoxy groups. For instance, WIPO Publication 00/18751 ("WO 00/18751") discusses an epoxy obtained by first reacting trimethylolpropane with 10,11-undecenoic acid and by subsequently epoxidizing the unsaturated groups of the thus obtained ester using an oxidizing agent. In example 5 of this publication, a composition comprising the exemplified epoxy ester, isophorone diamine, and fairly large amounts of bisphenol A diglycidyl ether is cured. Although the exemplified epoxy ester of WO 00/18751 may provide improved reactivity when compared to esters having internal epoxy groups, further improvements in reactivity of mixtures comprising the esters are still desired.

Accordingly, aspects of the present invention include improving the cure speed of mixtures comprising epoxy-terminated esters. Other aspects include providing network polymers formed by curing mixtures comprising epoxy-terminated esters, wherein the network polymers have a comparatively high glass transition temperature, excellent UV stability, improved toughness, and/or improved adhesion.

SUMMARY OF THE INVENTION

The present invention provides network polymers obtained by curing compositions comprising:
(i) an ester having at least two terminal epoxy groups; and
(ii) a curing agent;

wherein the compositions further comprise a polymerization accelerator if the compositions comprise an aliphatic amine curing agent.

Preferred esters for preparing the present network polymers include those represented by the following formula (1):

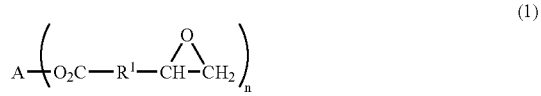

(1)

wherein
each $R^1$ independently represents a substituted or unsubstituted homoaliphatic or heteroaliphatic group;

A represents a substituted or unsubstituted homoalkylene, heteroalkylene, arylene, or heteroarylene segment; and
n represents an integer equal to or greater than 2.

DETAILED DESCRIPTION OF THE PREFERRED EMBODIMENTS

Homoaliphatic and Heteroaliphatic Groups

A homoaliphatic group refers to an aliphatic radical consisting essentially of carbon and hydrogen atoms, and containing two free univalencies: one univalency participating in a bond with the carboxyl carbon and the other univalency participating in a bond with the epoxy group as shown in formula (1). The homoaliphatic group will be selected from: methylene; and aliphatic radicals containing at least two carbon atoms, each of two of which bears a single, free univalency.

A heteroaliphatic group refers to a homoaliphatic group, as defined above, which further comprises other atom(s) that may be present in the main chain or main ring(s), as or as part of a substituent(s) thereto, or both. Such other atoms include, for instance, oxygen, nitrogen, sulfur, and halogen atoms. Preferably, the other atom(s) will be present as or as part of a substituent(s) attached to the main chain or ring(s). Preferably at least 40 wt % of the heteroaliphatic group is comprised of carbon and hydrogen atoms, more preferably at least 60 wt %, even more preferably at least 80 wt %, and yet even more preferably at least 90 wt %. Homoaliphatic and heteroaliphatic groups: may be and/or may include cyclic structure(s) (e.g., mono-, bi-, and tri-cycloaliphatic groups, and so forth); and/or may contain unsaturated bond(s), as, e.g., alkene group(s) and/or alkyne group(s) (and in the case of heteroaliphatic groups, may contain heteroalkene groups, e.g., cyano group(s), and/or heteroalkyne groups). Preferably the homoaliphatic and heteroaliphatic groups are saturated.

Examples of preferred substituents in homoaliphatic and heteroaliphatic groups include: alkyl and alkenyl groups, which may be or contain cyclic structures; and aryl groups. Particularly preferred alkyl and alkenyl group substituents in homo- and hetero-aliphatic groups include, but are not limited to, homo-: octenyl and octyl groups; heptenyl and heptyl groups; hexenyl and hexyl groups; pentenyl and pentyl groups; butenyl and butyl groups; propenyl and propyl groups; ethenyl and ethyl groups; and methyl groups. Particularly preferred alkyl group substituents in homo- and hetero-aliphatic groups include propyl, ethyl, and methyl groups.

Examples of preferred substituents in heteroaliphatic groups further include: hydroxyl, nitro, and cyano groups; halogens; heteroalkyl and heteroalkenyl groups, which may be or contain cyclic structures; and heteroaryl groups. Particularly preferred heteroalkyl and heteroalkenyl group substituents in heteroaliphatic groups include, but are not limited to, hetero-: octenyl and octyl groups; heptenyl and heptyl groups; hexenyl and hexyl groups; pentenyl and pentyl groups; butenyl and butyl groups; propenyl and propyl groups; ethenyl and ethyl groups; and methyl groups. Particularly preferred heteroalkyl group substituents in heteroaliphatic groups include heteropropyl, heteroethyl, and heteromethyl groups.

Each $R^1$ group in a given ester molecule, as defined in formula (1) may be a structure different from one or more of the other $R_1$ group(s) in the molecule. In a preferred embodiment, every $R^1$ in a given ester molecule represents an identical group.

Homoalkylene and Heteroalkylene Segments

A homoalkylene segment refers to an aliphatic radical consisting essentially of carbon and hydrogen atoms, and containing at least two carbon atoms, and containing "n" free univalencies, where "n" is as defined below. Preferably, the homoalkylene segment will contain up to about 200 carbon atoms, more preferably up to about 100 carbon atoms, even more preferably up to about 50 carbon atoms, still more preferably up to about 40 carbon atoms, yet more preferably up to about 30 carbon atoms, yet even more preferably up to about 20 carbon atoms, and yet still more preferably up to about 10 carbon atoms. In a preferred embodiment, the homoalkylene segment will contain 2-12 carbon atoms, more preferably 2-10 carbon atoms, even more preferably 2-8 carbon atoms, still more preferably 2-6 carbon atoms, and yet more preferably 2-4 carbon atoms (all ranges being stated inclusively). In a particularly preferred embodiment, the homoalkylene segment will contain 3 carbon atoms. The free univalencies of the homoalkylene segment may be located on different carbon atoms, the same carbon atom(s), or a combination thereof, provided that no single carbon atom contains more than three univalencies (as for alkylidyne, alkenylidyne, and alkynylidyne functionalities on terminal carbon atoms). Preferably, no single carbon atom will contain more than two free univalencies (as for alkylidene, alkenylidene, and alkynylidene functionalities); more preferably, no single carbon atom will contain more than one free univalency (as for alkyl, alkenyl, and alkynyl functionalities). Thus, homoalkylene segments include, but are not limited to: aliphatic di-, tri-, tetra-, penta-, hexa-, hepta-, octa-yl radicals, and so forth. Each one of the "n" free univalencies of the homoalkylene segment will participate in a bond with the carboxyl oxygen of one of the "n" groups as shown in formula (1).

Examples of preferred homoalkylene segments include, but are not limited to: aliphatic di-yl radicals containing at least two carbon atoms, aliphatic tri-yl radicals containing at least three carbon atoms, aliphatic tetra-yl radicals containing at least four carbon atoms, and so forth. Preferred examples of homoalkylene segments include, but are not limited to: ethylene; propane-1,2,-diyl; propane-1,3-diyl; propane-1,2,3-triyl; butane-di-, tri-, and tetra-yls; pentane-di-, tri-, tetra-, and penta-yls; hexane-di-, tri-, tetra-, penta-, and hexa-yls; heptane-di-, tri-, tetra-, penta-, hexa-, and hepta-yls; and octane-di-, tri-, tetra-, penta-, hexa-, hepta-, and octa-yls. More preferred are: ethylene; propane-1,2,-diyl; propane-1,3-diyl; propane-1,2,3-triyl; and butane-di-, tri-, and tetra-yls. Particularly preferred are ethylene; propane-1,2,-diyl; propane-1,3-diyl; and propane-1,2,3-triyl.

A heteroalkylene segment refers to a homoalkylene segment, as defined above, which further comprises other atom(s) that may be present in the main chain and/or ring(s), as or as part of a substituent(s), or both. Such other atoms include, for instance, oxygen, nitrogen, sulfa, and halogen atoms. Preferably, the other atom(s) will be present as or as part of a substituent(s) attached to the main chain and/or ring(s). Preferably at least 40 wt % of the heteroaliylene group is comprised of carbon and hydrogen atoms, more preferably at least 60 wt %, even more preferably at least 80 wt %, and yet even more preferably at least 90 wt %. Homoalkylene and heteroalkylene segments: may be and/or may include cyclic structure(s) (e.g., mono-, bi-, and tri-cycloaliphatic groups, and so forth); and/or may contain unsaturated bond(s), as, e.g., alkene group(s) and/or alkyne group(s) (and in the case of heteroalkylene segments, may contain heteroalkene groups, e.g., cyano group(s), and/or heteroalkyne groups). Preferably the homoalkylene and heteroalkylene segments are saturated.

Examples of preferred substituents in homoalkylene and heteroalkylene segments include: alkyl and alkenyl groups, which may be or contain cyclic structures; and aryl groups. Particularly preferred alkyl and alkenyl group substituents in homo- and hetero-alkylene segments include, but are not limited to, homo-: octenyl and octyl groups; heptenyl and heptyl groups; hexenyl and hexyl groups; pentenyl and pentyl groups; butenyl and butyl groups; propenyl and propyl groups; ethenyl and ethyl groups; and methyl groups. Particularly preferred alkyl group substituents in homo- and hetero-alkylene segments include propyl, ethyl, and methyl groups.

Examples of preferred substituents in heteroalkylene segments further include: hydroxyl, nitro, and cyano groups; halogens; heteroalkyl and heteroalkenyl groups, which may be or contain cyclic structures; and heteroaryl groups. Particularly preferred heteroalkyl and heteroalkenyl group substituents in heteroalkylene segments include, but are not limited to, hetero-: octenyl and octyl groups; heptenyl and heptyl groups; hexenyl and hexyl groups; pentenyl and pentyl groups; butenyl and butyl groups; propenyl and propyl groups; ethenyl and ethyl groups; and methyl groups. Particularly preferred heteroalkyl group substituents in heteroalkylene segments include heteropropyl, heteroethyl, and heteromethyl groups.

Arylene and Heteroarylene Segments

An arylene segment refers to an aryl or alkyaryl radical having "n" free univalencies, where "n" is defined below, and having among its ring carbon atoms, at least one that bears a single, free univalency, and preferably two that bear, a single, free univalency each. Preferably, the arylene segment will contain at least 6 carbon atoms. Preferably, the arylene segment will contain up to about 200 carbon atoms, more preferably up to about 100 carbon atoms, even more preferably up to about 50 carbon atoms, still more preferably up to about 40 carbon atoms, yet more preferably up to about 30 carbon atoms, yet even more preferably up to about 20 carbon atoms. In a preferred embodiment, the arylene segment will contain up to about 10 carbon atoms. In a preferred embodiment, the arylene segment will contain 6-25 carbon atoms, more preferably 6-20 carbon atoms, even more preferably 6-18 carbon atoms, and still more preferably 6-15 carbon atoms; in a particularly preferred embodiment, the arylene segment will contain 6-12 carbon atoms (all ranges being stated inclusively). The free univalencies of the arylene segment may be located on different carbon atoms, the same carbon atom(s), or a combination thereof, provided that no single carbon atom contains more than three univalencies (as for alkylidyne, alkenylidyne, and alkynylidyne fimctionalities on a terminal carbon of an aliphatic portion of an alkaryl radical). Preferably, no single carbon atom will contain more than two free univalencies (as for arylidene, alkylidene, alkenylidene, and alkynylidene functionalities); more preferably, no single carbon atom will contain more than one free univalency (as for aryl, alkyl, alkenyl, and alkynyl functionalities). Thus, arylene segments include, but are not limited to: aryl and alkaryl di-, tri-, tetra-, penta-, hexa-, hepta-, octa-yl radicals, and so forth. Each one of the "n" free univalencies of the arylene segment will participate in a bond with the carboxyl oxygen of one of the "n" groups as shown in formula (1). (The term "alkaryl" refers to structures containing at least one aromatic ring to which at least one aliphatic group is attached.)

A heteroarylene segment refers to an arylene segment, as defined above, which further comprises other atom(s) that may be present in the main ring(s) and/or chain, as or as part of a substituent(s), or both. Such other atoms include, for instance, oxygen, nitrogen, sulfur, and halogen atoms. Preferably, the other atom(s) will be present as or as part of a substituent(s) attached to the main ring(s) and/or chain. Preferably at least 40 wt % of the heteroarylene group is comprised of carbon and hydrogen atoms, more preferably at least 60 wt %, even more preferably at least 80 wt %, and yet even more preferably at least 90 wt %. Alkyl groups present in arylene and heteroarylene segments: may be and/or may include cyclic structure(s) (e.g., mono-, bi-, and tri-cycloaliphatic groups, and so forth); and/or may contain unsaturated bond(s), as, e.g., alkene group(s) and/or alkyne group(s) (and, in the case of heteroarylene segments, may contain heteroalkene group(s), e.g., cyano group(s), and/or heteroalkyne group(s)). Preferably any aliphatic groups present in arylene and heteroarylene segments are saturated.

Examples of preferred substituents in arylene and heteroarylene segments include: alkyl and alkenyl groups, which may be or contain cyclic structures; and aryl groups. Particularly preferred alkyl and alkenyl group substituents in arylene and heteroarylene segments include, but are not limited to, homo-: octenyl and octyl groups; heptenyl and heptyl groups; hexenyl and hexyl groups; pentenyl and pentyl groups; butenyl and butyl groups; propenyl and propyl groups; ethenyl and ethyl groups; and methyl groups. Particularly preferred alkyl group substituents in arylene and heteroarylene segments include propyl, ethyl, and methyl groups.

Examples of preferred substituents in heteroarylene segments further include: hydroxyl, nitro, and cyano groups; halogens; heteroalkyl and heteroalkenyl groups, which may be or contain cyclic structures; and heteroaryl groups. Particularly preferred heteroalkyl and heteroalkenyl group substituents in heteroarylene segments include, but are not limited to, hetero-: octenyl and octyl groups; heptenyl and heptyl groups; hexenyl and hexyl groups; pentenyl and pentyl groups; butenyl and butyl groups; propenyl and propyl groups; ethenyl and ethyl groups; and methyl groups. Particularly preferred heteroalkyl group substituents in heteroarylene segments include heteropropyl, heteroethyl, and heteromethyl groups.

Values for "n"

The value of n is an integer equal to or greater than 2. In a preferred embodiment, n is equal to or less than about 50; in a preferred embodiment, n is equal to or less than about 40; in a preferred embodiment, n is equal to or less than about 30; in a preferred embodiment, n is equal to or less than about 25; in a preferred embodiment, n is equal to or less than about 20; in a preferred embodiment, n is equal to or less than about 18; in a preferred embodiment, n is equal to or less than about 15; in a preferred embodiment, n is equal to or less than about 12; in a preferred embodiment, n is equal to or less than about 10; in a preferred embodiment, n is equal to or less than 9; in a preferred embodiment, n is equal to or less than 8; in a preferred embodiment, n is equal to or less than 7; in a preferred embodiment, n is equal to or less than 6; in a preferred embodiment, n is equal to or less than 5; in a preferred embodiment, n is equal to or less than 4; in a preferred embodiment, n is equal to or less than 3. Preferably n is 2 to about 20; more preferably, n is 2 to about 10; even more preferably, n is 2 to 8; still more preferably, n is 2 to 6; yet more preferably, n is 2 to 5; yet even more preferably, n is 2 to 4; yet still more preferably, n is 2 or 3 (all ranges being stated inclusively). In a particularly preferred embodiment, n is 3.

The present invention provides compositions, and network polymers obtained by curing the compositions, wherein the compositions comprise at least the following components:

(i) an ester having at least two terminal epoxy groups; and
(ii) a curing agent.

(i) Esters Having at Least Two Terminal Epoxy Groups

Examples of epoxy-terminated esters that are suitable for preparing the polymers of this invention include those represented by the following formula (1):

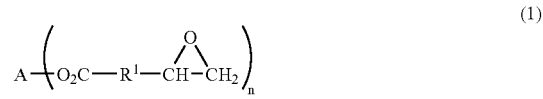

(1)

wherein each $R^1$ independently represents a substituted or unsubstituted homoaliphatic or heteroaliphatic group;

A represents a substituted or unsubstituted homoalkylene, heteroalkylene, arylene, or heteroarylene segment; and n represents an integer equal to or greater than 2.

Some further examples of epoxy-terminated esters that are suitable for preparing the polymers of this invention are given in U.S. Pat. No. 4,540,657, WO Patent Application WO 00/18571, and Japanese Patent JP62075450A2, which are all hereby incorporated in their entirety by reference.

A preferred ester is a triacylglyceride comprising a terminal epoxide group on each of its three side chains, as represented by the following formula (2):

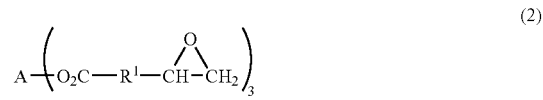

(2)

wherein each $R^1$ independently represents a substituted or unsubstituted homoaliphatic or heteroaliphatic group; and A is represented by the following formula (3):

(3)

Examples of triacylglycerides comprising a terminal epoxide group on each of its three side chains include 10,11-epoxyundecenoyl triglyceride, 9,10-epoxydecenoyl triglyceride and 4,5-epoxypentenoyl triglyceride.

Preferably, each $R^1$ can be independently selected from the group consisting of moieties represented by the following formulae (4) or (5):

(4)

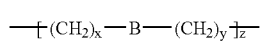 (5)

wherein $n^1$ represents an integer of 1 to 40, preferably 1 to 20, more preferably 5 to 15, most preferably 8 to 15;

x represents an integer of 0 to 20, preferably 1 to 15, more preferably 3 to 15, most preferably 5 to 15;

y represents an integer of 0 to 20, preferably 1 to 15, more preferably 3 to 15, most preferably 5 to 15;

x+y is an integer of 0 to 40, preferably 2 to 30, more preferably 5 to 25, most preferably 10 to 25;

z represents an integer of 1 to 4, preferably 1 to 2, more preferably z is 1; and B represents sulfur, oxygen, carboxylate, nitrogen, amide, or an epoxy represented by the following formula (6):

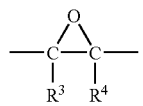 (6)

wherein $R^3$ and $R^4$ independently represent hydrogen or a moiety represented by the following formula (7):

$CH_3-(CH_2)_p-$  (7)

wherein p represents an integer of 0 to 20, preferably from 1 to 10, more preferably from 1 to 5.

Preferably B is represented by formula (6).

Preferably all the $R^1$ groups are represented by formula (4) or all the $R^1$ groups represented by formula (5). More preferably all the $R^1$ groups are represented by formula (4). Still more preferably, all the $R^1$ groups are identical.

Other preferred esters comprising terminal epoxide groups include those represented by the following formula (8):

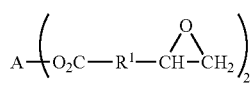 (8)

wherein $R^1$ is as defined above, and
wherein A is represented by ethylene, propylene, butylene, or the following formula (9):

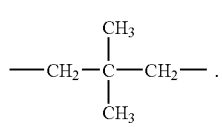 (9)

Still other preferred esters comprising terminal epoxide groups are represented by the following formula (10):

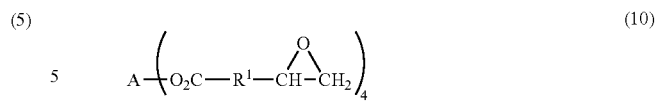 (10)

wherein $R^1$ is as defined above, and
wherein A is represented by the following formula (11):

 (11)

The epoxy-terminated esters used in the present invention are readily polymerized and may be used to form homopolymers, but they may also be copolymerized with other components. An advantage of the present esters is that the terminal epoxy groups provide improved reactivity when appropriate polymerization catalysts and accelerators are used.

Preferably curable compositions according to the present invention comprise, relative to the total weight of epoxy-functional components present in the composition, at least 40 wt. % of epoxy-terminated ester, more preferably at least 50 wt. %, even more preferably at least 65 wt. %, and most preferably at least 80 wt. %.

(ii) Curing Agent, and (iii) Polymerization Accelerator

The present compositions comprise a suitable aliphatic amine or non-aliphatic-amine curing agent.

Suitable aliphatic amine curing agents include, for instance, 1,2-diaminocyclohexane, isophorone diamine, ethylenediamine, diethylenetriamine, triethylenetetraamine, tertraethylenepentamine, ethanolamine, piperazine, aminoethylpiperazine, aminoethylethanolamine, diethylaminopropylamine, dimethylaminopropylamine, 2,5-dimethyl-2,5-hexanediamine, bis(aminocyclohexyl)methane, 3-amino-1-cyclohexylaminopropane, polyethanolamine, polypropanolamine, polyethyleneimine, and mixtures thereof.

When aliphatic amine curing agents are used, the composition also comprises a suitable polymerization accelerator. Examples of suitable polymerization accelerators include, for instance, multifinctional acrylate monomers, phenolics, monofunctional acids, novolacs, and bisphenols.

Suitable phenolics include, for instance, 4-tert-butylphenol, catechol, 2-chlorophenol, 4-nitrophenol, 2,4-dimethylphenol and nonylphenol.

Suitable multifinctional acrylates include, for instance, tripropylene glycol diacrylate and trimethylolpropane triacrylate.

Suitable monofumctional acids include, for instance, salicylic acid, 5-chlorosalicylic acid, 2,4-dichlorobenzoic acid and valeric acid.

Suitable bisphenols include for instance, bisphenol A (4,4'-isopropylidenediphenol), bisphenol F [bis(4-hydroxyphenyl)methane] and 2,2'-bisphenol.

Examples of suitable non-aliphatic-amine curing agents include, for instance, aromatic amines, isocyanates, bisphenols, anhydrides, polyfunctional acids, imidazoles, polyfunctional mercaptans, boron trihalide complexes, dicyanamides, and mixtures thereof.

Suitable aromatic amine curing agents include, for instance, diaminobenzene, methylenedianiline, oxydianiline, diaminodiphenylsulfide, diaminodiphenylsulfone, 2,4-bis-(p-aminobenzyl)anline, diaminotoluene, ketimine, amidoamine, and mixtures thereof.

Suitable anhydrides include, for instance, benzophenone tetracarboxylic acid anhydride, chlorendric anhydride, succinic anhydride, dodecenylsuccinic anhydride, hexahydrophtalic anhydride, maleic anhydride, methyl hexahydrophtalic anhydride, tetrahydrophtalic anhydride, nadic anhydride, phtalic anhydride, polyadipic polyanhydride, polyazelaic polyanhydride, polysebasic polyanhydride, pyromellitic anhydride, and mixtures thereof.

Suitable polyfunctional acids include, for instance, adipic acid, sebasic acid, azelaic acid, terephtalic acid, isophtalic acid, cyclohexanedicarboxylic acid, and mixtures thereof.

Suitable imidazoles include, for instance, 2-methylimidazole, 2-hydroxypropylimidazole, 2-heptadecylimidazole, 1-benzyl-2-methylimidazole, 2-ethyl-4-methylimidazole, 1-cyanoethyl-2-ethyl-4-methylimidazole, 2-phenyl-4-methylimidazole, 2-phenyl-4,5-dihydroxymethylimidazole, and mixtures thereof.

Suitable boron trihalide complexes include, for instance, boron tifluoride diethyl etherate.

Iodonium salts (e.g. diaryliodonium salts), and sulfonium salts (e.g. triarylsulfonium salts) may also be used as curing agents. A preferred diaryliodonium salt is diaryliodonium hexafluoroantimonate. The compositions containing iodonium salts and sulfonium salts may also comprise any suitable photosensitizer such as, for instance, anthracene, pyrene, perylene, and mixtures thereof.

When non-aliphatic-amine curing agents are present in the composition, the composition preferably further comprises a polymerization catalyst.

(iv) Polymerization Catalyst

The compositions may optionally comprise a suitable polymerization catalyst. Examples of suitable polymerization catalysts include, for instance, tertiary amines, Lewis acids, and onium salts.

Suitable tertiary amines include, for instance, benzyldimethylamine, 2-dimethylaminomethylphenol, and 2,4,6-tris(dimethylaminomethyl)phenol.

Suitable Lewis acids include, for instance, stannous octoate and dibutyltin dilaurate.

Suitable onium salts which can be used as a catalyst include, for intance, ammonium salts (e.g. tetrabutylammonium bromide).

(v) Further Reactive Components

The present compositions may comprise, besides one or more of the epoxy-terminated esters, any further suitable reactive components such as, for instance, other epoxy-functional components, hydroxy-functional components, as well as mixtures thereof. Preferably the compositions comprise, besides the epoxy-terminated ester, at least one further epoxy fimctional component, such as for instance, the diglycidyl ether of bisphenol A. The improved properties which can be imparted to network polymers based on the diglycidyl ether of bisphenol A by the addition of the epoxy-terminated ester are in the areas of toughness, flexibility, and resistance to ultraviolet radiation and moisture. Preferred diglycidyl ethers of bisphenol A include those represented by the following formula (12):

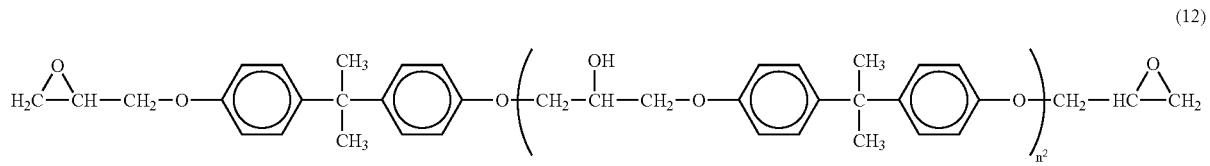

(12)

wherein $n^2$ represents an integer of 0-10.

(vi) Additives

The compositions of the present invention may comprise any suitable additives. For instance, pigments may be added to color the compositions. Other suitable additives which may be added include, for instance, stabilizers (e.g. antioxidants), rheology control agents, flame retardants, light stabilizers, flow modifiers, color stabilizers, and inert fillers. Inert fillers can be both inorganic (e.g. glass beads, talc, silica particles, or clays) or organic (e.g. polysaccharides, modified polysaccharides, and naturally occurring particulate fillers).

(vii) Water and Organic Solvent

The compositions may further comprise water and/or organic solvents, for instance to facilitate spraying the present compositions on a substrate.

Curing and Properties

Curing of the present compositions may be initiated by any suitable means, for instance by heat and/or radiation, such as ultraviolet (UV) radiation or electromagnetic radiation. Because the present epoxy-terminated esters comprise at least two epoxy groups, the present compositions will generally form a crosslinked network upon cure, which crosslinked network is also referred to as a "network polymer".

Preferably, the present compositions exhibit, after cure, a glass transition temperature of at least −25° C., more preferably at least 0° C., even more preferably at least 20° C., and most preferably at least 30° C. Preferably the present compositions, after cure, have a cross hatch adhesion rating, as measured according to ASTM 3359, of at least 3, more preferably at least 4, and most preferably 5.

Applications

The polymers obtained from the epoxy-terminated esters are useful in a wide variety of applications. For instance they are useful in coatings, in matrix materials for composites (e.g. for composites that are reinforced with fibers such as glass fibers, polyamide fibers, polyester fibers, carbon fibers, or naturally occurring fibers such as wood, jute, ramie, flax, bamboo, or sisal fibers), in adhesives and molded parts. The epoxy-terminated ester monomers can also be used in blends, for instance in blends comprising a thermoplastic polymers (e.g. polyvinylchloride or polyvinylidenechloride). The epoxy-terminated ester monomers may act as a plasticizer for the thermoplastic polymers.

The present compositions may be used to coat substrates, for instance wood, metal, or plastic substrates. The compositions may be applied as a solid or as a liquid. Preferably the compositions are applied as a liquid and by spraying the compositions onto the substrate.

EXAMPLES

The following examples are given as particular embodiments of the invention and to demonstrate the practice and advantages thereof. It is to be understood that the examples are given by way of illustration and are not intended to limit the specification or the claims that follow in any manner.

Synthesis 1: Preparation of 10,11-epoxyundecenoyl Triglyceride

A mixture consisting of 23.16 g of 32 weight percent peracetic acid solution, 0.69 g sodium acetate, and 30.4 ml of methylene chloride was added dropwise to a stirred solution of 16.00 g 10-undecenoyl triglyceride in 137 ml methylene. After the addition was complete, the thus obtained mixture was heated to 41° C. under reflux and maintained at that temperature for 15 hours. The mixture was then allowed to cool down to room temperature and the organic layer was washed once with 101.4 g of 10% aqueous sodium bisulfite, and then washed twice with 158.4 g of a saturated solution of sodium bicarbonate. The organic layer then was washed three times with 100 ml of water and dried by the addition of anhydrous magnesium sulfate which was then removed by filtration. The solvent in the mixture was removed in vacuo (10 mbar pressure) at about 62° C. to yield 15.44 g of 10,11-epoxyundecenoyl triglyceride.

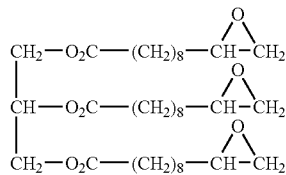

10,11-epoxyundecenoyl triglyceride

Example 1

Preparation and Curing of a Neat Resin Casting of 10,11-epoxyundecenoyl Triglyceride 10 g of the 10,11-epoxyundecenoyl triglyceride prepared according to Synthesis 1 was heated to 120° C. in a glass bottle. Phthalic anhydride (6.83 g) was then added and the resulting mixture was stirred to completely dissolve the anhydride, after which the thus obtained solution was cooled to 110° C. and 0.34 g of tetrabutylammonium bromide was added. The mixture was then poured into a glass mold (5×3×0.125 inch) and maintained at 120° C. for 1 hour in a convection oven. The temperature was then increased to 130° C. and held for 4 hours. The resulting clear casting was then removed from the mold, placed between two plates and post cured for 1 hour at 180° C.

A sample of the thus obtained casting was analyzed by dynamic mechanical thermal analysis at a heating rate of 3° C./minute from −100 to 250° C. at a frequency of 1 Hz. The sample showed an onset of loss in storage modulus at 65° C. Flexural properties were determined for the casting using ASTM method D 790. This testing showed a modulus of 293,695 psi [2.03 Gpa], a yield strength of 11,240 psi [77.5 Mpa], and a strength at break of 10,160 psi [70.1 Mpa].

Example 2

Preparation and Testing of a Coating Comprising the 10,11-epoxpundecenoyl Triglyceride 7.00 g of the 10,11-epoxyundecenoyl triglyceride prepared according to Synthesis 1 and an equivalent amount of a commercial, cycloaliphatic diamine (3.8638 g of ANCAMINE 2423, trademark of Air Products and Chemical, Inc.) were combined and stirred together to obtain a homogeneous mixture. Differential scanning analysis for this mixture was conducted at a heating rate of 10° C. per minute from 25° C. to 250° C. This analysis showed a cure exotherm with an onset of 50° C. and a peak of 130° C. The mixture was then applied to 3 smooth, cold roll steel plates using a 10 mil draw down bar. The plates were placed in a 60° C. oven for 6 days to cure the coatings. The cured coatings obtained were 3 mils (±0.49 mils) thick. The following properties were obtained for these coatings:

Pendulum Hardness (ASTM Method D 4366-95-Method A)=96
Conical Bend (ASTM Method D 522-93a)=Passed
Cross Hatch Adhesion (ASTM Method 3359)=5 Rating (No Failure)
Methyl Ethyl Ketone Double Rubs (ASTM Method D 4752-87)=200+

6.43 g of the 10,11-epoxyundecenoyl triglyceride and an equivalent amount of ANCAMINE 2423 (3.55 grams) were combined together to obtain additional material for testing. This mixture was then applied to 3 Tru Aluminum unpolished, coil coat white panels (3 inch×6 inch×0.038 inch) from ACT Laboratories. These panels were placed in a 60° C. oven for 7 days to cure the coatings. After curing, the gloss of the coatings was measured using a glossmeter according to ASTM method D-523. The gloss (percent light reflectance) at angles of 60° and 85° for these coated panels were 90.9 and 95.1, respectively. The panels were then placed in an apparatus described in ASTM Method G-53 in which they were alternately exposed to 4 hours of ultraviolet light at 60° C. and to 4 hours of water condensation at 50° C. in a repetitive cycle. The ultraviolet irradiation in this apparatus was from an array of UV-A type lamps operating at a wavelength of 340 nm. To determine the effect of these conditions on the gloss, the panels were briefly removed from the apparatus, approximately, every 100 hours and measurements were made. During the 3100 hours of testing, a high level of gloss retention was observed for these coated panels. After 3100 hours of exposure, the gloss at angles of 60° and 85° for the coated panels were 88.4 and 93.1, respectively. Gloss data after 1000 hours is given in Table 2.

Example 3

Preparation and Testing of a Coating Comprising the Diplycidyl Ether of Bisphenol A 5.75 g of a commercial diglycidyl ether of bisphenol A (D.E.R. 331 epoxy resin, trademark of The Dow Chemical Co.) and an equivalent amount of a commercial, cycloaliphatic diamine (3.70 g of ANCAMINE 2423, trademark of Air Products and Chemical, Inc.) were combined and stirred together to obtain a homogeneous mixture. Differential scanning analysis for this mixture was conducted at a heating rate of 10° C. per minute from 25° C. to 250° C. This analysis showed a cure exotherm with an onset of 44° C. and a peak of 98° C. The mixture was then applied to 3 smooth, cold roll steel plates using a 10 mil draw down bar. The plates were placed in a 60° C. oven for 6 days to cure the coatings. The cured coatings obtained were 3 mils thick. The following properties were obtained for these coatings:

Pendulum Hardness (ASTM Method D 4366-95-Method A)=131

Conical Bend (ASTM Method D 522-93a)=Failed

Cross Hatch Adhesion (ASTM Method 3359)=0 Rating (Failed)

Methyl Ethyl Ketone Double Rubs (ASTM Method D 4752-87)=200+

20 g of the diglycidyl ether of bisphenol A and an equivalent amount of ANCAMINE 2423 (12.90 grams) were combined together to obtain additional material for testing. This mixture was then applied to 3 Tru Aluminum unpolished, coil coat white panels (3 inch×6 inch×0.038 inch) from ACT Laboratories. These panels were placed in a 60° C. oven for 7 days to cure the coatings. After curing, the gloss of the coatings was measured using a glossmeter according to ASTM method D-523. The gloss (percent light reflectance) at angles of 60° and 85° for these coated panels were 100 and 97.0, respectively. The panels were then placed in an apparatus described in ASTM Method G-53 in which they were alternately exposed to 4 hours of ultraviolet light at 60° C. and to 4 hours of water condensation at 50° C. in a repetitive cycle. The ultraviolet irradiation in this apparatus was from an array of UV-A type lamps operating at a wavelength of 340 nm. To determine the effect of these conditions on the gloss, the panels were briefly removed from the apparatus, approximately, every 100 hours and measurements were made. After 100 hours, a significant reduction in both 60° and 85° gloss was observed to start to occur. At 400 hours of exposure, the gloss at angles of 60° and 85° for the coated panels had been reduced to 5.0 and 19.8, respectively.

A portion of the mixture comprising the diglycidyl ether of bisphenol A and ANCAMINE 2423 was applied to 2 blasted steel plates (4 inch×6 inch×0.125 inch) using a 10 mil draw down bar. These plates were supplied by KTA-Tator Inc. and had a 2 mil profile. The plates were then placed in a 60° C. oven for 6 days to cure the coatings. After cure, the coatings, which had a thickness of 8.3 mils, were scribed according to ASTM method D-1654. They were then placed in an operating salt fog apparatus as described by ASTM Method B-117. In this apparatus the coated plates were exposed to a continuous spray of salt water at 35° C. for 1030 hours. After 1030 hours, the plates were removed from the salt spray apparatus and the coatings were evaluated according to ASTM Methods D-1654, D-610 and D-714. The coated plates after 1030 hours exhibited no rust, blisters or loss of adhesion from the scribe point.

Example 4

Preparation and Testing of a Coating Comprising a Blend of 10,11-epoxyundecenoyl Triglyceride and a Diglycidyl Ether of Bisphenol A The following were combined and stirred together to obtain a homogeneous mixture: 15.00 g of the 10,11-epoxyundecenoyl triglyceride prepared according to Synthesis 1, 15 g of a commercial diglycidyl ether of bisphenol A (D.E.R. 331 epoxy resin, trademark of The Dow Chemical Co.) and an equivalent amount of a commercial, cycloaliphatic diamine to cure both epoxies (17.91 g of ANCAMINE 2423, trademark of Air Products and Chemical, Inc.) Differential scanning analysis for this mixture was conducted at a heating rate of 10° C. per minute from 25° C. to 250° C. This analysis showed a cure exotherm with an onset of 37° C. and a peak of 97° C. A portion of this mixture was then applied to 3 smooth, cold roll steel plates using a 10 mil draw down bar and cured 6 days at 60° C. The following properties were obtained for these coatings:

Pendulum Hardness (ASTM Method D 4366-95-Method A)=130

Conical Bend (ASTM Method D 522-93a)=Passed

Cross Hatch Adhesion (ASTM Method 3359)=5 Rating (No Failure)

Methyl Ethyl Ketone Double Rubs (ASTM Method D 4752-87)=200+

A portion of the mixture comprising the 10,11-epoxyundecenoyl triglyceride, the diglycidyl ether of bisphenol A and ANCAMINE 2423 was applied to 3 Tru Aluminum unpolished, coil coat white panels (3 inch×6 inch×0.038 inch) from ACT Laboratories. These panels were placed in a 60° C. oven for 6 days to cure the coatings. After curing, the gloss of the coatings was measured using a gloss meter according to ASTM method D-523. The gloss (percent light reflectance) at angles of 60° and 85° for these coated panels were 98.8 and 98.5, respectively. The panels were then placed in an apparatus described in ASTM Method G-53 in which they were alternately exposed to 4 hours of ultraviolet light at 60° C. and to 4 hours of water condensation at 50° C. in a repetitive cycle. The ultraviolet irradiation in this apparatus was from an array of UV-A type lamps operating at a wavelength of 340 nm. To determine the effect of these conditions on the gloss, the panels were briefly removed from the apparatus, approximately, every 100 hours and measurements were made. During the 3000 hours of testing, good gloss retention (above 60 percent) was observed for these coated panels. After 3000 hours of exposure, the gloss at angles of 60° and 85° for the coated panels were 64.6 and 69.8, respectively. Gloss data after 1000 hours is given in Table 2.

A portion of the mixture comprising the 10,11-epoxyundecenoyl triglyceride, the diglycidyl ether of bisphenol A and ANCAMINE 2423 was applied to 2 blasted steel plates (4 inch×6 inch×0.125 inch) using a 10 mil draw down bar. These plates were supplied by KTA-Tator Inc. and had a 2 mil profile. The plates were then placed in a 60° C. oven for 6 days to cure the coatings. After cure, the coatings, which had a thickness of 6.3 mils, were scribed according to ASTM method D-1654. They were then placed in an operating salt fog apparatus as described by ASTM Method B-117. In this apparatus the coated plates were exposed to a continuous spray of salt water at 35° C. for 1030 hours. After 1030 hours, the plates were removed from the salt spray apparatus and the coatings were evaluated according to ASTM Methods D-1654, D-610 and D-714. The coated plates after 1030 hours exhibited no rust on the surface or loss of adhesion from the scribe point. The only adverse feature observed as a result of the slat spray exposure was a few large blisters.

TABLE 1

Coatings Properties

| Example | Epoxy Used | Conical Bend | Pendulum Hardness | Cross Hatch Adhesion Rating | Methyl Ethyl Ketone Double Rubs |
|---|---|---|---|---|---|
| 2 | 10,11-Epoxyundecenoyl Triglyceride | Pass | 96 | 5 (No Failure) | 200+ |
| 3 | Diglycidyl Ether of Bisphenol A | Failed | 131 | 0 (Failure) | 200+ |
| 4 | Blend of 1 to 1 by weight 10,11-Epoxyundecenoyl Triglyceride & Diglycidyl Ether of Bisphenol A | Pass | 130 | 5 (No Failure) | 200+ |

TABLE 2

Coatings Properties

| Example | Epoxy Used | 60° Gloss After 1000 hours of Exposure to UV-Condensation Cycle (% Reflectance) | 85° Gloss After 1000 hours of Exposure to UV-Condensation Cycle (% Reflectance) |
|---|---|---|---|
| 2 | 10,11-Epoxyundecenoyl Triglyceride | 90 | 95 |
| 3 | Diglycidyl Ether of Bisphenol A | <5 | <20 |
| 4 | Blend of 1 to 1 by weight 10,11-Epoxyundecenoyl Triglyceride & Diglycidyl Ether of Bisphenol A | 85.5 | 94.9 |

Example 5

Preparation and Testing of a Coating Comprising 10,11-epoxyundecenoyl Triglyceride and an Acrylate Accelerator The following were combined and stirred together to obtain a homogeneous mixture: 12.00 g of the 10,11-epoxyundecenoyl triglyceride prepared according to Synthesis 1, 3 g of a commercial trimethylolpropane triacrylate (SR 351 by the Sartomer Co.) and a commercial, cycloaliphatic diamine (6.38 g of ANCAMINE 1895, trademark of Air Products and Chemical, Inc.). This mixture was allowed to sit for one hour and then it was stirred again. After this 1 hour induction period, a portion of this mixture was applied to 2 smooth, cold roll steel plates using a 10 mil draw down bar and cured 6 days at 60° C. The cured coatings obtained had an average thickness of 5.67 mils. The following properties were obtained for these coatings:
Pendulum Hardness (ASTM Method D 4366-95-Method A)=89
Conical Bend (ASTM Method D 522-93a)=Passed
Cross Hatch Adhesion (ASTM Method 3359)=5 Rating (No Failure)
Methyl Ethyl Ketone Double Rubs (ASTM Method D 4752-87)=200+

A portion of the mixture comprising the 10,11-epoxyundecenoyl triglyceride, the trimethylolpropane triacrylate and ANCAMINE 1895 was applied to 1 Tru Aluminum unpolished, coil coat white panel (3 inch×6 inch×0.038 inch) from ACT Laboratories. This panel was placed in a 60° C. oven for 6 days to cure the coatings. After curing, the gloss of the coating was measured using a gloss meter according to ASTM method D-523. The gloss (percent light reflectance) at angles of 60° and 85° for the coated panel were 71.0 and 75.5, respectively. This panel was then placed in an apparatus described in ASTM Method G-53 in which it was alternately exposed to 4 hours of ultraviolet light at 60° C. and to 4 hours of water condensation at 50° C. in a repetitive cycle. The ultraviolet irradiation in this apparatus was from an array of UV-A type lamps operating at a wavelength of 340 nm. To determine the effect of these conditions on the gloss, the panel was briefly removed from the apparatus, approximately, every 100 hours and measurements were made. During the 3000 hours of testing, no loss of gloss was observed for this coated panel.

20.00 g of the 10,11-epoxyundecenoyl triglyceride, 5 g of the commercial trimethylolpropane triacrylate and 10.66 g of ANCAMINE 1895 were combined and stirred together to obtain additional material for testing. This mixture was allowed to sit for one hour and then it was stirred again. After this 1 hour induction period, the mixture was applied to 2 blasted steel plates (4 inch×6 inch×0.125 inch) using a 10 mil draw down bar. These plates were supplied by KTA-Tator Inc. and had a 2 mil profile. The plates were then placed in a 60° C. oven for 6 days to cure the coatings. After cure, the coatings, which had a thickness of 6.5 mils, were scribed according to ASTM method D-1654. They were then placed in an operating salt fog apparatus as described by ASTM Method B-117. In this apparatus the coated plates were exposed to a continuous spray of salt water at 35° C. for 1030 hours. After 1030 hours, the plates were removed from the salt spray apparatus and the coatings were evaluated according to ASTM Methods D-1654, D-610 and D-714. The plates after 1030 hours exhibited no rust or blisters on the surface. One coated plate showed no loss of adhesion at the scribe point, whereas, the other panel showed loss on one side of the scribe.

Example 6

Preparation and Testing of a Film Comprising the Diglycidyl Ether of Bisphenol A Four grams of a commercial diglycidyl ether of bisphenol A (D.E.R. 332, trademark of The Dow Chemical Co.) was blended with 1.12 grams of 4,4'-methylenedianiline, 6.6 grams of tetrahydrofuran and 2.4 grams of dinethylformamide in a glass vial and dissolved with agitation. The solution was filtered through a 0.45 µm filter prior to casting films on a tin plated steel sheet with an adjustable draw-down bar. The films were allowed to dry at room temperature for 30 minutes and cured in an oven at 150° C. for 2 hrs and 180° C. for 2 hrs. The films were lifted from the metal plate with mercury. The total energy to break of the films was tested by the single edge notch thin film fracture test. The results are shown in Table 3.

Example 7

Preparation and Testing of a Film Comprising the 10,11-epoxyundecenoyl Triglyceride Four grams of 10,11-epoxyundecenoyl triglyceride prepared according to Synthesis 1 was blended with 0.91 grams of 4,4'-methylenedianiline, 6.6 grams of tetrahydrofuran, 2.4 grams of dimethylformamide and 0.11 ml of stannous octoate in a glass vial and dissolved with agitation. The solution was filtered through a 0.45 µm filter prior to casting films on a tin plated steel sheet with an adjustable draw-down bar. The films were allowed to dry at room temperature for 30 minutes and cured in an oven at 120° C. for 2 hrs, 150° C. for 2 hrs and 180° C. for 2 hrs. The films were lifted from the metal plate with mercury. The total energy to break of the films was tested by the single edge notch thin film fracture test. The results are shown in Table 3.

Example 8

Preparation and Testing of a Film Comprising a Blend of the 10,11-epoxyundecenoyl Triglyceride and the Diglycidyl Ether of Bisphenol A 3.6 grams of a commercial diglycidyl ether of bisphenol A (D.E.R. 332, trademark of The Dow Chemical Co.) was blended with 0.4 grams of 10,11-epoxyundecenoyl triglyceride prepared according to Synthesis 1, 1.13 grams of 4,4'-methylenedianiline, 6.6 grams of tetrahydrofuran, and 2.4 grams of dimethylformamide in a glass vial and dissolved with agitation. The solution was filtered through a 0.45 µm filter prior to casting films on a tin plated steel sheet with an adjustable draw-down bar. The films were allowed to dry at room temperature for 30 minutes and cured in an oven at 120° C. for 2 hrs, 150° C. for 2 hrs and 180° C. for 2 hrs. The films were lifted from the metal plate with mercury. The total energy to break of the films was tested by the single edge notch thin film fracture test. The results are shown in Table 3.

Example 9

Preparation and Testing of a Film Comprising a Blend of the 10,11-epoxyundecenoyl Triglyceride and the Diglycidyl Ether of Bisphenol A 3.2 grams of a commercial diglycidyl ether of bisphenol A (D.E.R. 332, trademark of The Dow Chemical Co.) was blended with 0.8 grams of 10,11-epoxyundecenoyl triglyceride prepared according to Synthesis 1, 1.1 grams of 4,4'-methylenedianiline, 6.6 grams of tetrahydrofuran, and 2.4 grams of dimethylformamide in a glass vial and dissolved with agitation. The solution was filtered through a 0.45 µm filter prior to casting films on a tin plated steel sheet with an adjustable draw-down bar. The films were allowed to dry at room temperature for 30 minutes and cured in an oven at 120° C. for 2 hrs, 150° C. for 2 hrs and 180° C. for 2 hrs. The films were lifted from the metal plate with mercury. The total energy to break of the films was tested by the single edge notch thin film fracture test. The results are shown in Table 3.

Example 10

Preparation and Testing of a Film Comprising a Blend of the 10,11-epoxyundecenoyl Triglyceride and the Diglycidyl Ether of Bisphenol A 2.8 grams of a commercial diglycidyl ether of bisphenol A (D.E.R. 332, trademark of The Dow Chemical Co.) was blended with 1.2 grams of 10,11-epoxyundecenoyl triglyceride prepared according to Synthesis 1, 1.08 grams of 4,4'-methylenedianiline, 6.6 grams of tetrahydrofuran, and 2.4 grams of dimethylformamide in a glass vial and dissolved with agitation. The solution was filtered through a 0.45 µm filter prior to casting films on a tin plated steel sheet with an adjustable draw-down bar. The films were allowed to dry at room temperature for 30 minutes and cured in an oven at 120° C. for 2 hrs, 150° C. for 2 hrs and 180° C. for 2 hrs. The films were lifted from the metal plate with mercury. The total energy to break of the films was tested by the single edge notch thin film fracture test. The results are shown in Table 3.

TABLE 3

| | Film Properties | | |
|---|---|---|---|
| Example | Diglycidyl Ether of Bisphenol A (grams) | 10,11-Epoxyundecenoyl Triglyceride (grams) | Total energy to break (kJ/m$^2$) |
| 6 | 4 | 0 | 0.65 |
| 7 | 0 | 4 | 3.6 |
| 8 | 3.6 | 0.4 | 1.1 |
| 9 | 3.2 | 0.8 | 1.6 |
| 10 | 2.8 | 1.2 | 2.2 |

Example 11

Preparation and Testing of an Adhesive Comprising the Diglycidyl Ether of Bisphenol A Fourteen grams of a commercial diglycidyl ether of bisphenol A (D.E.R. 332, trademark of The Dow Chemical Co.) were blended with 0.84 grams of Cabosil TS 720 fumed silica and 0.42 g of Cataphote 5A micro-glass beads in a glass beaker at room temperature. The mixture was heated in an oven to 120° C. 3.92 grams of 4,4'-methylenedianiline were added to the mixture and the beaker was maintained at 114° C. while stirring until the amine was dissolved. The mixture was subsequently cooled down to room temperature. Lap shear test specimens with 0.5 inch overlap and T-peel samples were prepared on cold rolled steel and aluminum T2024 substrates for adhesion testing. The assembled samples were cured at 150° C. for 2 hrs and 180° C. for 2 hrs. The adhesion results are shown in Tables 4 and 5.

Example 12

Preparation and Testing of an Adhesive Comprising the 10,11-epoxyundecenoyl Triglyceride Fourteen grams of 10,11-epoxyundecenoyl triglyceride prepared according to Synthesis 1 were blended with 0.84 grams of Cabosil TS 720 fumed silica and 0.42 g of Cataphote 5A micro-glass beads in a glass beaker at room temperature. The mixture was heated in an oven to 120° C. 3.92 grams of 4,4'-methylenedianiline were added to the mixture and the beaker was maintained at 115° C. while stirring until the amine was dissolved. The mixture was cooled to 100° C. and 0.34 ml of stannous octoate were mixed in quickly. The mixture was subsequently cooled down to room temperature. Lap shear test specimens with 0.5 inch overlap and T-peel samples were prepared on cold rolled steel and aluminum T2024 substrates for adhesion testing. The assembled samples were cured at 120° C. for 2 hrs, 150° C. for 2 hrs and 180° C. for 2 hrs.

The adhesion results are shown in Tables 4 and 5.

Example 13

Preparation and Testing of an Adhesive Comprising a Blend of the 10,11-epoxyundecenoyl Triglyceride and the Diglycidyl Ether of Bisphenol A 12.6 grams of a commercial diglycidyl ether of bisphenol A (D.E.R. 332, trademark of The Dow Chemical Co.) were blended with 1.4 grams of 10,11-epoxyundecenoyl triglyceride prepared according to Synthesis 1, 0.84 grams of Cabosil TS 720 fumed silica and 0.42 g of Cataphote 5A micro-glass beads in a glass beaker at room temperature. The mixture was heated in an oven to 120° C. 3.92 grams of 4,4'-methylenedianiline were added to the mixture and the beaker was maintained at 115° C. while stirring until the amine was dissolved. The mixture was subsequently cooled down to room temperature. Lap shear test specimens with 0.5 inch overlap and T-peel samples were prepared on cold rolled steel and aluminum T2024 substrates for adhesion testing. The assembled samples were cured at 120° C. for 2 hrs, 150° C. for 2 hrs and 180° C. for 2 hrs. The adhesion results are shown in Tables 4 and 5.

Example 14

Preparation and Testing of an Adhesive Comprising a Blend of the 10,11-epoxyundecenoyl Trigluceride and the Diglycidyl Ether of Bisphenol A 11.2 grams of a commercial diglycidyl ether of bisphenol A (D.E.R. 332, trademark of The Dow Chemical Co.) were blended with 2.8 grams of 10,11-epoxyundecenoyl triglyceride prepared according to Synthesis 1, 0.84 grams of Cabosil TS 720 fumed silica and 0.42 g of Cataphote 5A micro-glass beads in a glass beaker at room temperature. The mixture was heated in an oven to 120° C. 3.86 grams of 4,4'-methylenedianiline were added to the mixture and the beaker was maintained at 115° C. while stirring until the amine was dissolved. The mixture was subsequently cooled down to room temperature. Lap shear test specimens with 0.5 inch overlap and T-peel samples were prepared on cold rolled steel and aluminum T2024 substrates for adhesion testing. The assembled samples were cured at 120° C. for 2 hrs, 150° C. for 2 hrs and 180° C. for 2 hrs. The adhesion results are shown in Tables 4 and 5.

Example 15

Preparation and Testing of an Adhesive Comprising a Blend of the 10,11-epoxyundecenoyl Triglyceride and the Diglycidyl Ether of Bisphenol A 9.8 grams of a commercial diglycidyl ether of bisphenol A (D.E.R 332, trademark of The Dow Chemical Co.) were blended with 4.2 grams of 10,11-epoxyundecenoyl triglyceride prepared according to Synthesis 1, 0.84 grams of Cabosil TS 720 fumed silica and 0.42 g of Cataphote 5A micro-glass beads in a glass beaker at room temperature. The mixture was heated in an oven to 120° C. 3.77 grams of 4,4'-methylenedianiline were added to the mixture and the beaker was maintained at 115° C. while stirring until the amine was dissolved. The mixture was subsequently cooled down to room temperature. Lap shear test specimens with 0.5 inch overlap and T-peel samples were prepared on cold rolled steel and aluminum T2024 substrates for adhesion testing. The assembled samples were cured at 120° C. for 2 hrs, 150° C. for 2 hrs and 180° C. for 2 hrs. The adhesion results are shown in Tables 4 and 5.

TABLE 4

Adhesive Properties on Steel

| Example | Diglycidyl Ether of Bisphenol A (grams) | 10,11-Epoxyundecenoyl Triglyceride (grams) | Peel Strength on Steel (pli) | Lap Shear Strength on Steel (psi) |
| --- | --- | --- | --- | --- |
| 11 | 14 | 0 | 3.0 | 2700 |
| 12 | 0 | 14 | 5.1 | 2800 |
| 13 | 12.6 | 1.4 | 3.2 | 3000 |
| 14 | 11.2 | 2.8 | 3.3 | 3100 |
| 15 | 9.8 | 4.2 | 3.7 | 2500 |

TABLE 5

Adhesive Properties on Aluminum

| Example | Diglycidyl Ether of Bisphenol A (grams) | 10,11-Epoxyundecenoyl Triglyceride (grams) | Peel Strength on Aluminum (pli) | Lap Shear Strength on Aluminum (psi) |
| --- | --- | --- | --- | --- |
| 11 | 14 | 0 | 2.9 | 2460 |
| 12 | 0 | 14 | 3.2 | 2600 |
| 13 | 12.6 | 1.4 | 2.4 | 2100 |
| 14 | 11.2 | 2.8 | 2.2 | 2300 |
| 15 | 9.8 | 4.2 | 2.4 | 2500 |

Synthesis 2: Preparation of 4,5-epoxypentenoyl Triglyceride

A mixture consisting of 27.38 g of 32 weight percent peracetic acid solution, 0.81 g sodium acetate, and 36.0 ml of methylene chloride was added drop wise to a stirred solution of 10.00 g 4-pentenoyl triglyceride in 100 ml methylene. After the addition was complete, the thus obtained mixture was heated to 41° C. under reflux and maintained at that temperature for 15.5 hours. The mixture was then allowed to cool down to room temperature and the organic layer was washed once with 120.7 g of 10% aqueous sodium bisulfite, and then washed twice with 187.5 g of a saturated solution of sodium bicarbonate. The organic layer then was washed three times with 100 ml of water and dried by the addition of anhydrous magnesium sulfate which was then removed by filtration. The solvent in the mixture was removed in vacuo (10 mbar) at about 60° C. to yield 9.11 g of 4,5-epoxypentenoyl triglyceride.

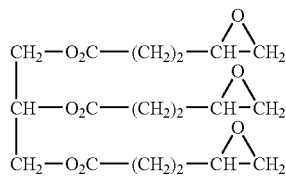

4,5-epoxypentenoyl triglyceride

Example 16

Preparation and Curing of a Neat Resin Casting of 4,5-epoxyentenoyl Triglyceride 16.66 g of the 4,5-epoxypentenoyl triglyceride prepared according to Synthesis 2 was heated to 120° C. in a glass bottle. An equivalent amount of 4,4'-methylenedianiline (6.24 g) was then added and the resulting mixture was reheated to 110° C. with stirring to completely dissolve the 4,4'-methylenedianiline. This mixture was placed in a vacuum bell jar (10 mbar) to remove entrapped air after which it was poured into a glass mold (5×3×0.125 inch). The glass mold was maintained at 120° C. for 24 hours in a convection oven then the clear casting was removed from the mold.

A sample of the thus obtained casting was analyzed by dynamic mechanical thermal analysis at a heating rate of 3° C./minute from −100 to 250° C. at a frequency of 1 Hz. The sample showed an onset of loss in storage modulus at 112° C. Flexural properties were determined for the casting using ASTM method D 790. This testing showed a modulus of 457,110 psi [3.16 Gpa] and a strength at break of 17,275 psi [119.2 Mpa].

Example 17

Preparation and Room Temperature Curing of a Resin Composition Based on 10,11-epoxyundecenoyl Triglyceride 0.4340 g of bisphenol A (0.003803 equivalents) was added to 1.6590 g of 10,11-epoxyundecenoyl triglyceride (0.007605 equivalents) prepared according to Synthesis 1. This mixture, which was contained in a glass vial, was heated to 140° C. to dissolve the bisphenol A. After dissolving the bisphenol A, the mixture was poured into a small aluminum pan and cooled to room temperature. Based on the amount of 10,11-epoxyundecenoyl triglyceride poured into the aluminum pan (1.5409 grams), an equivalent amount of 1-(2-aminoethyl)piperazine (0.3042 grams) was added. This composition was stirred and sampled for DSC analysis. This DSC analysis, which was conducted at 10° C./minute from 20 to 300° C., showed a cure exotherm with an onset temperature of 35° C. and a peak temperature of 104° C. Following the sampling for DSC, the composition was allowed to sit at room temperature (approximately 24° C.). At 12 hours the composition was observed to be Dry-To-Touch and Dry-To-Handle according to ASTM Method D1640. At 24 hours an additional sample was taken for DSC analysis. Based on the initial cure energy measured, the DSC analysis for the composition at 24 hours showed that 90% of the cure had occurred.

Examples 18-23

Preparation and Room Temperature Curing of Resin Compositions Based on Mixtures of 10,11-epoxyundecenoyl Triglyceride with a Bisphenol A Diglycidyl Ether Resin compositions were prepared by mixing 10,11-epoxyundecenoyl triglyceride prepared according to Synthesis 1 with a bisphenol A diglycidyl ether (D.E.R. 331 epoxy resin) at the weight ratios given in Table 6. Bisphenol A accelerator was optionally added to the epoxy mixtures and dissolved using the method described in Example 19. These mixtures were poured into an aluminum pan and isophorone diamine was added in an equivalent amount to the epoxide present. The mixtures were sampled for DSC analysis, which was conducted at 10° C./minute from 20 to 300° C., and then they were allowed to sit at room temperature. Additional DSC samples were taken at 24 hours and 7 days to determine the extent of cure. These DSC analyses were conducted at 10° C./minute from −50 to 300° C. From the DSC analysis at 7 days, the glass transition temperature was also determined. The compositions were also tested every 12 hours to determine the approximate Dry-To-Touch and Dry-To-Handle Times according to ASTM Method D1640. These data are reported in Table 6.

TABLE 6

Room Temperature Curing of Resin Compositions Based on Mixtures of 10,11-Epoxyundecenoyl Triglyceride with a Bisphenol A Diglycidyl Ether

|  | Ex. 18 | Ex. 19 | Ex. 20 | Ex. 21 | Ex. 22 | Ex. 23 |
|---|---|---|---|---|---|---|
| Weight Ratio of 10,11-Epoxyundecenoyl Triglyceride to D.E.R. 331 Epoxy Resin | 8/1 | 8/1 | 4/1 | 4/1 | 4/6 | 4/6 |
| Equivalency of Bisphenol A accelerator used based on Total Epoxide | 0 | 0.5 | 0 | 0.5 | 0 | 0.5 |
| Cure Onset Temperature by DSC, °C. | 66 | 37 | 65 | 32 | 49 | 26 |
| Cure Peak Temperature by DSC, °C. | 156 | 111 | 143 | 101 | 120 | 85 |
| % Cure at 24 hours based on DSC Analysis | 48 | 75 | 54 | 77 | 73 | 81 |
| % Cure at 7 days based on DSC Analysis | 83 | 92 | 81 | 90 | 90 | 90 |
| Glass Transition Temperature at 7 days based on DSC Analysis, °C. | −25 | 22 | 1 | 30 | 50 | 50 |
| Approximate Dry-To-Touch Time, hours | >48 | 24 | >48 | 12 | 12 | 3 |
| Approximate Dry-To-Handle Time, hours | >48 | 24 | >48 | 12 | 24 | 6 |

Synthesis 3: Preparation of epoxidized 10-undecenoic Acid/trimethylolpropane Ester 10-undecenoic acid/trimethylolpropane ester (0.142 mols, 90 g) and chloroform (360 g). were added to a 1 liter, jacketed round bottom flask equipped with a bottom drain, a thermometer, 125 mL addition funnel, glycol-cooled condenser, electric stirrer and glass stirring rod with teflon paddles. With constant stirring, a mixture of 32 wt % peracetic acid (0.469 mols, 111.5 g) and sodium acetate (0.040 mols, 3.32 g,) was added drop-wise via the addition funnel. The peracetic acid was added at a rate to maintain the reaction temperature below 20° C. The reaction was allowed to run at room temperature (~24° C.) for 10 hours. When the reaction was complete, as determined by HPLC analyses, the contents of the flask were cooled to below 20° C. and washed with a 10 wt % aqueous solution of sodium sulfite. After phase separating, the aqueous layer was discarded and the organic layer was washed with a saturated solution of sodium bicarbonate. Again after phase separation, the aqueous layer was discarded and the organic layer was washed numerous times with de-ionized until the aqueous layer had a neutral pH. The organic layer was dried with magnesium sulfate, vacuumed-filtered and the solvent removed under reduced pressure at 60-65° C. using a rotary evaporator. The resulting epoxidized 10-undecenoic acid/trimethyolpropane ester (91.7 g) was a clear brown oil with an epoxide equivalent weight of 254 (theoretical EEW=227).

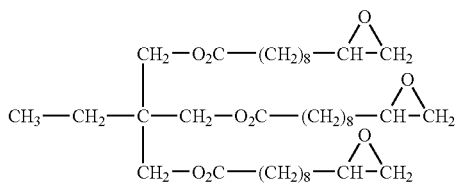

epoxidized 10-undecenoic acid/trimethylolpropane ester

Examples 24-29

Preparation and Room Temperature Curing of Resin Compositions Based on Mixtures of Epoxidized 10-undecenoic Acid/trimethylolpropane Ester with a Bisphenol A Diglycidyl Ether Resin compositions were prepared by mixing an epoxidized 10-undecenoic acid/trimethylolpropane ester prepared according to Synthesis 3 with a bisphenol A diglycidyl ether (D.E.R. 331 epoxy resin) at the weight ratios given in Table 7. Bisphenol A accelerator was optionally added to the epoxy mixtures and dissolved using the method described in Example 19. These mixtures were poured into an aluminum pan and isophorone diamine (99+%, from Aldrich) was added in an equivalent amount to the epoxide present. The mixtures were sampled for DSC analysis, which was conducted at 10° C./minute from 20 to 300° C., and then they were allowed to sit at room temperature. Additional DSC samples were taken at 24 hours and 7 days to determine the extent of cure. These DSC analyses were conducted at 10° C./minute from −50 to 300° C. From the DSC analysis at 7 days, the glass transition temperature was also determined. The compositions were also tested every 12 hours to determine the approximate Dry-To-Touch and Dry-To-Handle Times according to ASTM Method D1640. These data are reported in Table 7.

TABLE 7

Room Temperature Curing of Resin Compositions Based on Mixtures of an Epoxidized 10-Undecenoic Acid/ Trimethylolpropane Ester with a Bisphenol A Diglycidyl Ether

| | Ex. 24 | Ex. 25 | Ex. 26 | Ex. 27 | Ex. 28 | Ex. 29 |
|---|---|---|---|---|---|---|
| Weight Ratio of Epoxidized Ester to D.E.R. 331 Epoxy Resin | 8/1 | 8/1 | 4/1 | 4/1 | 4/6 | 4/6 |
| Equivalency of Bisphenol A accelerator used based on Total Epoxide | 0 | 0.5 | 0 | 0.5 | 0 | 0.5 |
| Cure Onset Temperature by DSC, °C. | 63 | 42 | 56 | 37 | 51 | 28 |
| Cure Peak Temperature by DSC, °C. | 147 | 115 | 130 | 100 | 115 | 85 |
| % Cure at 24 hours based on DSC Analysis | 38 | 58 | 42 | 75 | 64 | 84 |
| % Cure at 7 days based on DSC Analysis | 63 | 82 | 68 | 82 | 74 | 78 |
| Glass Transition Temperature at 7 days based on DSC Analysis, °C. | −27 | 9 | −15 | 17 | 42 | 43 |
| Approximate Dry-To-Touch Time, hours | >48 | 24 | >48 | 24 | 12 | 4 |
| Approximate Dry-To-Handle Time, hours | >48 | 24 | >48 | 24 | 24 | 4 |

Examples 30-32

Preparation and Room Temperature Curing of Resin Compositions Based on Mixtures of Epoxidized 10-undecenoic Acid/trimethylolpropane Ester with a Bisphenol A Diglycidyl Ether Examples 24, 26, and 28 were repeated, except that the commercial isophorone diamine curing agent Hardener HY-5083 from Vantico Limited was used instead of the 99+% isophorone diamine from Aldrich. The results are shown in Table 8.

TABLE 8

Room Temperature Curing of Resin Compositions Based on Mixtures of an Epoxidized 10-Undecenoic Acid/ Trimethylolpropane Ester with a Bisphenol A Diglycidyl Ether

| | Ex. 30 | Ex. 31 | Ex. 32 |
|---|---|---|---|
| Weight Ratio of Epoxidized Ester to D.E.R. 331 Epoxy Resin | 8/1 | 4/1 | 4/6 |
| Cure Onset Temperature by DSC, °C. | 60 | 52 | 46 |
| Cure Peak Temperature by DSC, °C. | 147 | 130 | 114 |
| % Cure at 24 hours based on DSC Analysis | 42 | 40 | 68 |
| % Cure at 7 days based on DSC Analysis | 64 | 66 | 79 |
| Glass Transition Temperature at 7 days based on DSC Analysis, °C. | −25 | −18 | 44 |
| Approximate Dry-To-Touch Time, hours | >48 | >48 | 12 |
| Approximate Dry-To-Handle Time, hours | >48 | >48 | 24 |

Having described specific embodiments of the present invention, it will be understood that many modifications thereof will readily be apparent to those skilled in the art, and it is intended therefore that this invention is limited only by the spirit and scope of the following claims.

What is claimed is:

1. A network polymer resulting from curing a composition comprising
   (I) An epoxy-terminated ester selected from the group consisting of 10,11-epoxyundecenoyl triglyceride, 9,10-epoxydecenoyl triglyceride, and 4,5-epoxypentenoyl triglyceride;
   the composition comprising at least 40 wt. % of said epoxy-terminated ester, relative to the total weight of epoxy-functional components present in the composition;
   (II) optionally, one or more further epoxy-functional component(s) other than the epoxy-terminated ester (I); and
   (III) a curing component selected from the group consisting of:
     (A) one or more aliphatic amine curing agents with an accelerator;
     (B) one or more non-aliphatic-amine curing agents with a polymerization catalyst, the non-aliphatic-amine curing agent or agents being selected from the group consisting of aromatic amines, isocyanates, bisphenols, polyfunctional acids, imidazoles, polyfunctional mercaptans, boron trihalide complexes, dicyanamides, and mixtures thereof; and
     (C) one or more iodonium salt or sulfonium salt curing agents optionally with a polymerization catalyst and optionally with a photosensitizer.

2. The network polymer of claim 1 wherein said further epoxy-functional component is a diglycidyl ether of bisphenol A.

3. The network polymers of claim 2 wherein the diglycidyl ether of bisphenol A is represented by the following formula (12):

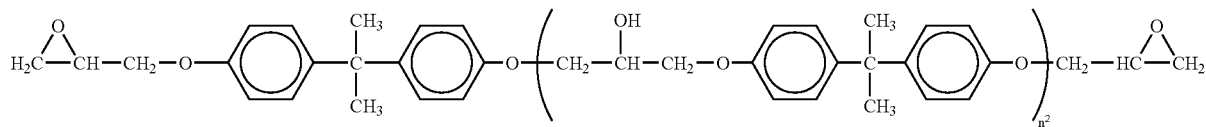

(12)

wherein $n^2$=0 to 10.

4. The network polymer of claim 1, wherein said composition comprises an accelerator selected from the group consisting of multifunctional acrylates, phenolics, monofunctional acids, novolacs, and bisphenols.

5. The network polymer of claim 1, wherein said composition comprises a non-aliphatic-amine curing agent selected from the group consisting of aromatic amines, bisphenols, polyfunctional acids, imidazoles, and boron trihalide complexes, and mixtures thereof.

6. The network polymer of claim 1, wherein said composition comprises a catalyst selected from the group consisting of tertiary amines, Lewis acids, and onium salts.

7. The network polymer of claim 1, wherein said composition comprises an iodonium salt or sulfonium salt curing agent selected from the group consisting of diaryliodonium salts and triarylsulfonium salts.

8. The network polymer of claim 1, wherein said network polymer is formed by curing said composition by the application of heat or electromagnetic radiation.

9. The network polymer of claim 1, wherein said ester is selected from the group consisting of 10,11-epoxyundecenoyl triglyceride and 9,10-epoxydecenoyl triglyceride.

10. The network polymer of claim 1, wherein said ester is 4,5-epoxypentenoyl triglyceride.

11. The network polymer of claim 1, wherein said composition further comprises antioxidants, flame retardants, pigments, flow modifiers, color stabilizers or inert fillers.

12. A resin casting comprising the network polymer of claim 1.

13. A film comprising the network polymer of claim 1.

14. A coated substrate comprising the network polymer of claim 1.

15. The coated substrate of claim 14, wherein the substrate includes metal, plastic or wood.

16. An adhesive layer or bonding agent comprising the network polymer of claim 1.

17. A curable composition comprising

An epoxy-terminated ester selected from the group consisting of 10,11-epoxyundecenoyl triglyceride, 9,10-epoxydecenoyl triglyceride, and 4,5-epoxypentenoyl triglyceride;
  the composition comprising at least 40 wt. % of said epoxy-terminated ester, relative to the total weight of epoxy-functional components present in the composition;

(II) optionally, one or more further epoxy-functional component(s) other than the epoxy-terminated ester (I); and (III) a curing component selected from the group consisting of:
  (A) one or more aliphatic amine curing agents with an accelerator;
  (B) one or more non-aliphatic amine curing agents with a polymerization catalyst, the non-aliphatic-amine curing agent or agents being selected from the group consisting of aromatic amines, isocyanates, bisphenols, polyfunctional acids, imidazoles, polyfunctional mercaptans, boron trihalide complexes, dicyanamides, and mixtures thereof; and
  (C) one or more iodonium salt or sulfonium salt curing agents optionally with a polymerization catalyst and optionally with a photosensitizer.

18. The network polymer of claim 1 wherein the accelerator is selected from the group consisting of bisphenol A, 2-chlorophenol, 2,4-dimethylphenol, 4-tert-butylphenol, trimethylolpropane triacrylate, salicylic acid, 5-chlorosalicylic acid, and 2,4-dichlorobenzoic acid.

* * * * *